INVENTOR.
ARNOLD G. SCHILBERG, deceased
IRENE G. SCHILBERG, administratrix
BY

*Andrus & Starke*

Attorneys

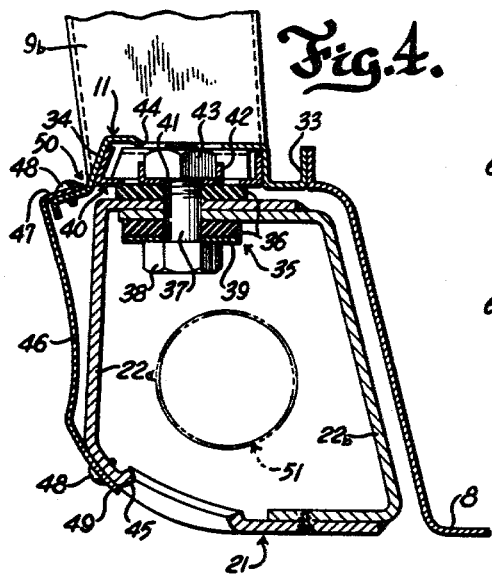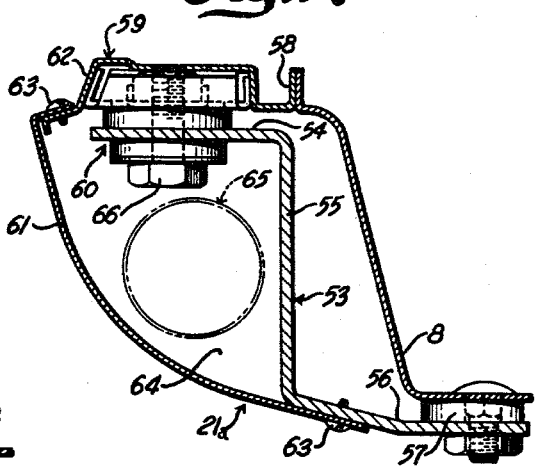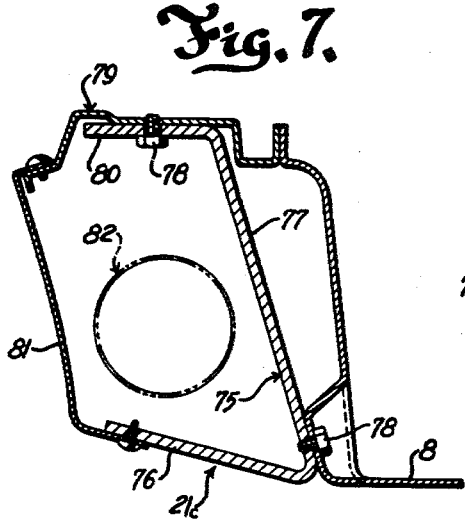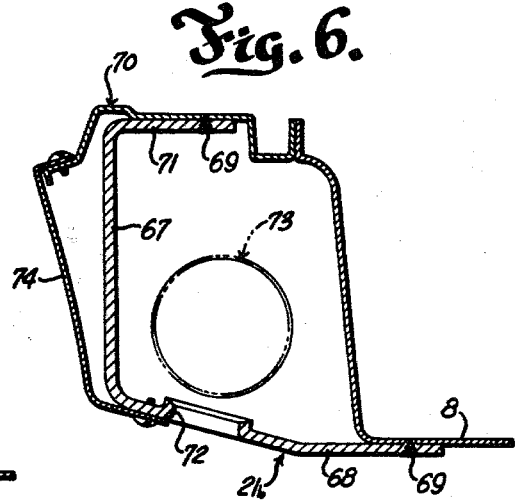
INVENTOR.
ARNOLD G. SCHILBERG, deceased
IRENE G. SCHILBERG administratrix
BY
Andrus & Starke
Attorneys

3,177,031
MOTOR VEHICLE HAVING INCREASED GROUND CLEARANCE LEVEL FLOOR SPACE

Arnold G. Schilberg, deceased, late of Milwaukee, Wis., by Irene G. Schilberg, special administratrix, Milwaukee, Wis., assignor to A. O. Smith Corporation, Milwaukee, Wis., a corporation of New York
Original application Aug. 17, 1959, Ser. No. 834,334, now Patent No. 3,084,971, dated Apr. 9, 1963. Divided and this application Aug. 20, 1962, Ser. No. 218,180
1 Claim. (Cl. 296—28)

The present invention relates to a motor vehicle construction having a separate body and frame and has particular reference to a vehicle in which the vehicle underbody is disposed at or near minimum ground clearance level.

This application is a division of the inventor's copending application Serial No. 834,334, now Patent No. 3,084,-971, filed August 17, 1959, and entitled "Motor Vehicle Having Increased Ground Clearance Level Floor Space."

With the continuing trend in automotive design to low vehicle silhouettes, passenger space within the vehicle has become increasingly reduced and as a result the passengers have been forced to assume unnatural and uncomfortable sitting positions. Considerable passenger discomfort has been caused by the lack of adequate low-level floor area in the forward and rear seating areas of the vehicle. On the other hand, the central "hump" formed in the vehicle underbody to receive the propeller drive shaft and exhaust conduit has become increasingly pronounced as the underbody is lowered toward the level of minimum ground clearance. Furthermore, since in the usual instance one or more frame members extend beneath the underbody in the floor areas of the latter, the underbody must be further contoured to receive the frame, thus sacrificing additional low-level floor space.

To obtain more adequate floor space, attempts have been made to design a frame which permits a more extensive and complete dropping of the underbody across the full width of the passenger compartment. One such design consists of the backbone or cruciform type of frame having a pair of rails extending longitudinally of the frame and diverging forwardly and rearwardly from a central tunnel area. This type of frame permits lowering of the underbody to the level of minimum ground clearance through the passenger compartment with the limitation that triangular shaped restrictions in the floor are necessary to receive divergent portions of the frame rails.

Another type of frame favorably adapted for minimum ground clearance floor disposition is the wide box section frame wherein one piece side rails are extended longitudinally of the frame along the sides thereof. The side rails are curved outwardly in the central portion of the frame and are disposed to extend immediately inwardly and parallel to the body side sills, thus providing a fairly wide space centrally of the frame to minimum ground clearance level. However, as it is necessary to form the underbody upwardly inwardly of the side sills to receive the frame side rails a complete lowering of the underbody in the passenger compartment area is not possible.

In both of the aforedescribed frame types then, the frame imposes some restriction upon a complete lowering of the underbody in the floor areas thereof to the level of minimum ground clearance.

Other attempts have been made to increase low-level floor space by reducing the breadth of the central drive shaft tunnel or "hump" by removing the exhaust conduit or conduits therefrom and in lieu thereof using dual exhaust conduits disposed one each along either side of the vehicle. In the case of the wide box section frame, it has been proposed to position the exhaust conduits immediately adjacent and inboard of the side rails. However, any gain in low-level floor represented by narrower "hump" was usually dissipated due to the necessity of forming the underbody upwardly along a line inwardly of the normal location adjacent the side rails to provide clearance with the exhaust conduit. As an alternative construction, the side rail has been decreased somewhat in sectional area to permit placing of the exhaust conduit in the area formerly occupied by the side rail. While this structure increases to some extent the low-level floor area, it results in a frame of reduced strength.

The aforedescribed frame types while permitting limited lowering of the floor to the level of minimum ground clearance, present porblems of attaining an efficient body-to-frame attachment. In either case, the body side sills lie outwardly of the frame and are attached to the frame rails through long overhanging frame brackets or outriggers, in the case of the backbone type frame, or directly through the underbody in the wide box section type of frame. Where connection is made through frame brackets, the body and frame connected members are disposed eccentrically relative to one another such that vertical loading creates substantial torsional forces on the connected members. To provide the necessary torsional rigidity, the frame and body must be over designed from the standpoint of bending loads. In the case of the non-eccentric attachment effected between the body understructure and frame, frame movement and noise is transmitted directly into the floor and amplified to appreciable levels due to the drumming properties of the light gauge underbody.

In the present invention, the above discussed limitations of frames adapted for use with vehicles having a low silhouette are minimized or eliminated by a frame construction formed to provide relatively narrow fore and aft frame sections connected to a wide offset central frame section disposed at minimum ground clearance level. Each frame section includes a pair of transversely spaced side rails with the side rails of the central frame section spaced to correspond to the spacing of the side walls of the body structure adapted to be supported by the frame.

According to the invention, the separate body structure is formed without the usual side sills and is assembled to the frame with the body side walls disposed directly above and connected to the uper surface of the side rails of the center frame section. The invention eliminates the need for overhanging frame brackets to secure body to frame as well as the need for attaching the frame into the floor areas of the body. Further, since the frame width corresponds to the width of the vehicle, for a given vehicle width, the invention provides a frame having maximum width and thus maximum torsional rigidity.

The frame structure of the invention is highly advantageous also in that it eliminates frame members from the floor areas of the body understructure and permits full and complete lowering of the floor to minimum ground clearance level in the passenger compartment without hindrance from the frame. A substantial increase in low-level floor area is thus effected at no increase in vehicle width and without requiring radical departure from conventional body and frame designs.

In one embodiment of the invention, the central frame section is formed of tubular side rails consisting of channel members welded together in facing relation with the outer member having a light gauge trim panel secured thereto to provide a slight appearance to the frame. It is contemplated to house the intermediate portion of dual exhaust conduits within the side rails to permit reduction of the "hump," thereby providing further low-level floor area. In other embodiments of the invention the side rails are formed of channel members disposed either in inwardly or outwardly facing relation. In the case of the inwardly facing channel, the sides of the underbody are disposed to close the rail to rigidify the latter and to form an enclosed space adapted to house the exhaust conduits. With the outwardly facing channel, the trim panel encloses and rigidifies the channel to form an exhaust conduit housing.

Other sectional rail shapes are contemplated and generally are closed by either the floor sides or by the trim panel for purposes specified above. The embodiments of the invention thus provide means for removing the exhaust conduit from the tunnel area and for disposing it in a location free of the floor areas of the underbody.

The accompanying drawings illustrate the best mode presently contemplated of carrying out the invention.

In the drawings:

FIG. 4 is an enlarged fragmentary section of the frame and body construction of FIG. 3 showing in phantom the arrangement in the frame of one of the exhaust conduits of the dual exhaust system shown in FIG. 2;

FIG. 5 is a view similar to FIG. 4 showing a further embodiment of the invention;

FIG. 6 is a view similar to FIG. 4 showing another embodiment of the invention; and FIG. 7 is a view illustrating a still further embodiment of the invention.

Figure 1:
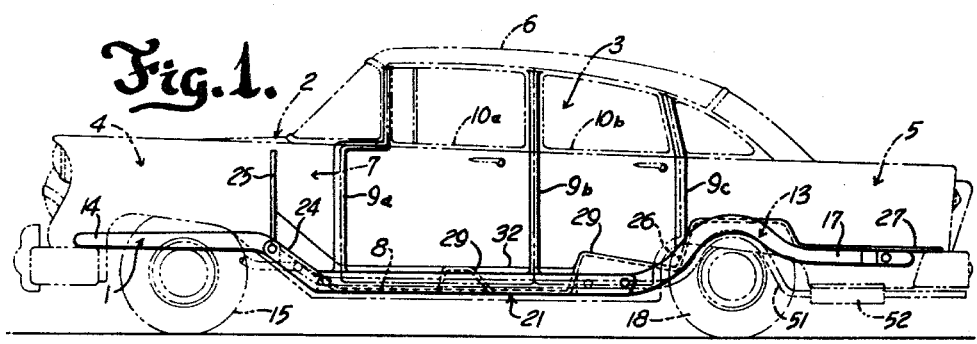
FIGURE 1 is a side elevation of a motor vehicle construction embodying the present invention with the vehicle body shown partly in phantom to reveal certain details of interior construction.
Figure 2:
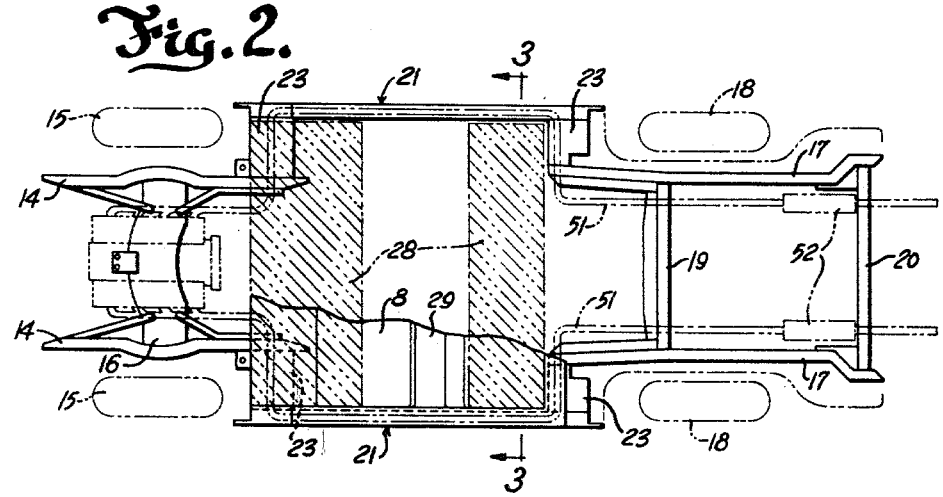
FIG. 2 is a plan view of the frame and underbody assembly of the vehicle of FIGURE 1 with the vehicle underbody shown partly in phantom, the vehicle being provided with a dual exhaust system in this instance.
Figure 3:
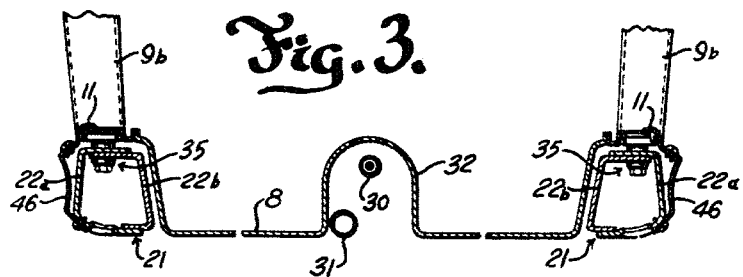
FIG. 3 is a view along the lines 3—3 of FIG. 2 showing the relative position and construction of the body and frame of the vehicle and showing a conventional center exhaust system for the vehicle.

With reference to the drawings and particularly to FIGS. 1–3, the present invention is directed to a motor vehicle construction comprised of separate frame and body assemblies 1 and 2 respectively with the frame disposed to support the body in a manner providing a low vehicle silhouette. For purposes of illustration, body 2 is depicted as a four door sedan having a central passenger seating compartment 3, a forward engine compartment 4, and a rear trunk or luggage compartment 5. The invention is particularly directed to the structure and relative position of frame 1 and body 2 in the area of passenger compartment 3 which includes a roof panel 6, a pair of spaced body side walls 7 and a sheet metal underbody 8. Side walls 7 define the transverse limits of passenger compartment 3 and each is formed with the door framing posts 9a, 9b, and 9c, disposed generally forwardly, centrally and rearwardly respectively in the passenger compartment, and with front and rear doors 10a and 10b respectively hingedly connected to the posts in the conventional manner. The sides of underbody 8 connect to body side walls 7 in a manner to be explained to provide therewith and with roof panel 6 an enclosed section across the passenger compartment. Each of the several door posts 9 is welded at its base to an elongated sheet metal plate 11 which extends along the sides of the body between the front and rear wheel assemblies 12 and 13 respectively of engine compartment 4 and trunk compartment 5. The body assembly of the invention is formed without the tubular body sills ordinarily disposed under and connected to the base of the door posts.

The frame of the invention is a modified version of the so-called wide box section or wide frame such as the type more fully illustrated and explained in Letters Patent 2,964,331, entitled "Vehicle Frame," issued December 13, 1960 and which is assigned to a common assignee with the present invention. In general, the frame includes a forward portion consisting of a pair of side rails 14 disposed between and connected to the front wheels 15. Side rails 14 are connected in transversely spaced relation by the cross bar assembly 16. Rearwardly, the frame is formed of a pair of side rails 17 disposed between and connected to the rear wheels 18. The rear side rails are connected in transversely spaced relation by the shock cross bar 19 and by the rear cross bar 20. The inner ends of each of the side rails 14 and 17 are curved downwardly to the level of minimum ground clearance to provide side rail kick-up in the wheel areas.

The intermediate or central section of frame 1 is comprised of a pair of tubular side rails 21 formed of two channel members 22a and 22b lap welded together in facing relation. As shown in FIG. 2, side rails 21 are disposed in transversely spaced relation outboard of the corresponding front and rear side rails 14 and 17 respectively and are disposed in general longitudinal alignment with the corresponding front and rear wheels 15 and 18 respectively. Side rails 21 are disposed at minimum ground clearance level and extend to and overlap the respective inner ends of side rails 14 and 17. The tubular torque boxes 23 are interposed between and connected to the overlapping ends of side rails 14 and 17 and side rails 21 to secure the several side rails together to provide a rigid frame structure having an outwardly offset, relatively wide center frame section.

The extent of offset between side rails 14 and 17 and central side rails 21 is sufficient to dispose the latter into the area ordinarily occupied by the body side sills of the conventional separate body and frame vehicle construction and to provide a central frame width corresponding to the width of passenger compartment 3. In comparison to the conventional vehicle, the invention provides a frame having an increased width in its central section and, inasmuch as frame torsional rigidity relates directly to the frame width, the invention provides a more rigid frame structure for a vehicle of a given width. Conversely, for a specified frame rigidity, the invention enables utilization of a lighter weight, less expensive frame construction.

Underbody 8 is received directly on frame 1 and extends the length thereof approximately from the forward limit of side rails 21. Near the front end, underbody 8 is formed to provide a toe board 24 and a fire wall 25 and near the rear end to provide a rear wall 26. Underbody 8 is extended over the rear portion of the frame to form the back wall 27 of the luggage compartment 5.

Between toe board 24 and rear wall 26, underbody 8 is lowered within frame 1 to extend to or closely approach the level of minimum ground clearance. In the forward and rear foot-floor areas of the underbody indicated by the cross hatched areas 28 of FIG. 2, underbody 8 is offset downwardly relative to the upper surface of side rails 21 substantially the full depth of the side rails. In the forward and rear seating areas of the underbody, little or no dropping of the underbody within the frame is effected to provide transversely extending, seat supports 29. To receive the drive shaft 30 and the exhaust conduit 31 of the vehicle, the underbody is formed with a drive shaft tunnel 32 extending centrally the length of the underbody.

The sides of underbody 8 are flanged upwardly along a line closely adjacent side rails 21 and are extended over the latter by attachment to the inboard edge of plate 11 which in the assembled vehicle extends above and lengthwise of side rails 21. As shown in FIG. 4, plate 11 is formed along its inboard edge to provide a channel shaped flange 33 disposed to face upwardly and offset downwardly relative to the flat, intermediate portion of the plate. The outboard edge of plate 11 is formed with a downwardly extending flange 34 to provide the plate with a relatively shallow downwardly opening, channel shaped portion. Plate 11 thus serves to connect underbody 8 to side walls 7 with the underbody disposed in inwardly and downwardly offset relation to the latter. Channel shaped flange 33 is adapted to contain the electrical conduits extending to the rear portion of the vehicle and is adapted to be covered by the floor carpeting in the completely finished vehicle.

Body 2 is mounted to frame 1 by means of the vertically extending body mounts 35 disposed between adjacent body and frame members at predetermined mounting locations. In a typical body-to-frame mounting arrangement, mounts 35 are disposed on either side of the centrally disposed door post and one each adjacent the forwardly and rearwardly disposed door posts in the central frame section. Other mounts are disposed on the forward frame section near the dash area of the vehicle and on the rear frame section, near the extreme limit of the body and in the area of rear wheels 18. Various other mounting arrangements may be used depending on the type of vehicle employed and/or the riding characteristics which are to be achieved.

A typical body-to-frame mount in the center frame section is shown in FIG. 4 and includes a pair of resilient pads 36 of rubber or other yieldable material disposed in vertical alignment on opposite sides of the upper surface of side rails 21. Pads 36 are adapted to dampen vibrations and deaden noise in the frame and are secured in place and body 2 and frame 1 positively connected by a bolt 37 extending vertically through the pads and frame 1 with the bolt head 38 disposed to engage the lower pad through a washer 39. The upper threaded end of bolt 37 extends from side rail 21 and into the channeled portion of plate 11 which is provided with an upwardly flanged insert 40 to reinforce the plate at the mount locations. Insert 40 is disposed with the flanged edges abutting against and secured to the inner surface of plate flanges 33 and 34 while the opposite flanged edges of the insert are extended outwardly along and welded to the flat portion of the plate.

Insert 40 is provided with a bolt receiving opening 41 and an integral nut retaining cage 42 disposed at the periphery of the opening and within the channeled portion of plate 11. Cage 42 is adapted to receive a nut 43 insertable therewithin through an opening 44 provided in plate 11.

For ease of assembling body-to-frame, the undersurface of side rail 21 is provided with access openings 45 at each mount location disposed in axial alignment with bolt 37 when the latter is secured in place. Frame opening 45 is large enough to permit bolt 37 to be inserted upwardly therethrough with washer 39 and the lower pad 36 mounted thereon and through frame 21 into the nut cage 42. Bolt 37 is then tightened to nut 43 to secure body-to-frame and to provide the desired compression of the pads.

To improve vehicle appearance, an elongated sheet metal trim panel 46 is secured along the outboard side of side rails 21 to completely enclose the outer portion thereof. Panel 46 is connected at its flattened upper edge 47 to plate flange 34 by a self-threading metal screw 48. The lower edge 49 of panel 46 is turned inwardly and under side rail 21 and connects into the underside thereof by an additional metal screw 48. If desired, panels 46 may be snapped in place by utilizing the inherent spring tension of the panel to retain suitable metal screws in the corresponding openings of plate flange 34 and side rail 21. The trim panel is spaced only slightly from side rail 21 between its connected edges and provides in connection with body side walls 7, a smooth unbroken contour. As shown in FIG. 4, panels 46 and plate flange 34 cooperate to define an indented portion at 50 in the area of the door flange. In the embodiment of the invention under discussion, trim panel 46 serves primarily to improve vehicle appearance. When damaged or otherwise required, panel 46 may be readily removed and replaced by removing screws 48.

The present invention provides a frame and body arrangement and structure which disposes the frame members completely free of the underbody in the passenger seating compartment of the body, permitting the underbody to be positioned on the frame in a manner providing relatively wide, flat, foot receiving areas at a minimum ground clearance level on either side of the central drive shaft tunnel. In some cases it has been determined that an increase of from 5 to 6 inches is provided in the distance between the vehicle center line to the side limit of the offset portion of the floor over the coventional prior art vehicles embodying a separate frame and body. This increase in floor space is beneficial also in that as the side edge of the downwardly offset segment of the underbody is moved outwardly, a corresponding reduction of the "step-over" distance into the vehicle or the threshold width is effected to thereby facilitate passenger entrance and exit into and out of the vehicle.

From the standpoint of attaining an efficient body-to-frame connection, the structure of the invention is also advantageous since the frame side rails are disposed directly under the body door posts and are connected thereto in direct, non-eccentric relation, thereby improving body and frame co-action and increasing the resistance of the overall vehicle to deflection. Further, since the connection is effected through the underbody in a relatively rigid portion thereof, the tendency of the underbody to amplify noises transmitted thereto is reduced. As a result, the stiffness of the body mounting pads may be increased to provide better co-operation between frame and body.

Where desired the breadth of drive shaft tunnel 32 may be reduced to some extent by removing exhaust conduit 31 therefrom and replacing it with dual exhaust conduits extending generally along the sides of the vehicle. Heretofore, in the case of vehicles incorporating side positioned conduits, the latter extended generally beneath the sides of the underbody in the passenger compartment of the vehicle. The floor portions of the underbody thus had to be formed over the conduits thereby substantially nullifying any increase in floor space represented by a narrower tunnel.

In accordance with one aspect of the present invention, the limitations of the prior art are overcome by disposing the exhaust conduits, indicated by the dot-dash lines 51 of FIGS. 2 and 4, directly within the frame members of the central frame section. With this arrangement, the conduits traverse the passenger seating compartment of the vehicle completely free of the underbody and permit a narrower hump without sacrifice of floor space in other areas of the underbody. The general course of conduits 51 is illustrated in FIG. 2 and as shown therein, the conduits are formed outwardly near their front end and extended through side rails 14 and forward torque box 23. From torque box 23, conduits 51 extend lengthwise through side rails 21 and, at a point adjacent the end of the rails, are formed inwardly through the rear torque box 23 and through the inner end of side rails 17 in identical fashion to that at the front of rails 21. The rear portion of conduits 51 is disposed generally parallel and adjacent to side rails 17 and curves downwardly in the region of rear wheels 18 beneath the frame for connection to a muffler 52.

The exhaust conduits are preferably assembled within the frame members in the aforedescribed relation thereto by first locating the frame members forming the conduit housing in an un-assembled condition about or on a previously configured conduit and thereafter assembling the members and securing adjacent members together by welding in predetermined sequence. The frame members are provided with suitable conduit retaining brackets (not shown) to support conduits 51 within the frame and are also packed with suitable insulation to prevent heating of the frame. Due to the relative inaccessibility of the conduits for replacement purposes, the conduits are preferably formed of stainless steel.

Various embodiments of the invention are contemplated all of which incorporate a frame having a wide central frame section with the side rails disposed directly beneath the body side walls and connected directly thereto in non-eccentric relation. All embodiments of the invention also provide for side sill elimination and substantial foot receiving or floor areas in the underbody with minimum step-over distance.

According to the embodiment of FIG. 5, the center frame section side rails 21a are formed of an integral Z-shaped member 53 having an outwardly extending upper flange 54, a substantially vertically extending web 55, and an inwardly extending lower flange 56. Lower flange 56 is disposed to support underbody 8 along the outer limit of the downwardly offset portion of the latter by means of a resilient pad 57 suitably bolted or otherwise secured in place. The underbody sides are flanged upwardly adjacent web 55 and, as in the previous instance, are welded to the flanged inner edge 58 of a plate 59 formed identically to plate 11. Plate 59 is disposed above and connected to side rails 21a and to body door posts 9 in identical fashion to that described earlier. Body 2 is mounted to frame 1 by means of the body mounts 60 identical in all respects to those described in connection with FIGS. 1–4.

As in the previous embodiment of the invention, a light gauge trim panel 61 extends along the outward side of side rail 21a and is secured at its upper edge to the plate outboard flange 62 and at its lower edge to the underside of side rail lower flange 56 by the metal screws 63. Panel 61 forms in conjunction with side rail 21a, a suitable enclosure indicated generally at 64 and which is adapted to house one of a pair of side positioned exhaust conduits 65.

In this embodiment of the invention, ready access to exhaust conduits 65 and the body-to-frame mounting bolts 66 may be gained simply by removing panel 61. It is preferred to utilize a stainless steel exhaust conduit, however, due to the difficulty in removing the exhaust conduits wherein the central portion thereof is disposed on one side of web 55 and the conduit ends on the opposite side.

Side rail web 55 is disposed in a vertical plane but where desired, the web may be inclined from the vertical as by moving the lower portion thereof outboardly to provide increased side rail strength.

According to another embodiment of the invention and referring to FIG. 6, the frame side rails 21b are formed of an inwardly facing channel shaped member 67, the lower flange 68 of which is elongated in an inboard direction to extend under underbody 8 in the outer offset position thereof. Flange 68 is secured to underbody 8 by a burn through weld 69. Underbody 8 is flanged upwardly from the supported portion thereof and is secured to a plate 70 of similar construction to previously described plates 11 and 59 disposed to engage the upper channel flange 71 between the flanged sides of the plate. A second burn through weld 69 secures plate 70 to channel flange 71 with both welds being made from the underside of the frame. For purposes of the weld 69 on flange 71, side rail flange 68 is provided with openings 72 directly beneath the desired weld location to permit the entry of welding equipment.

The flanged sides of underbody 8 together with the inner edge of plate 70 complement the open channel section of the side rail and define therewith a box section which from a structural standpoint is a considerable improvement over the open section rail. The closed side rail 21b is adapted to house a side positioned exhaust conduit 73 as in earlier embodiments.

The usual exterior trim strip 74 is disposed on the outer surface of side rail 21b and is secured thereto in identical fashion to that described in connection with the embodiments of FIGS. 4–5.

In the embodiment of FIG. 7, the side rails 21c are comprised of a channel member 75 disposed in outward facing relation with the lower flange 76 formed upwardly to define an acute angle with the channel web 77. Underbody 8 is attached at the outer limits of its offset portion of the channel web 77 by means of a self-threading, metal screw 78. The flanged sides of underbody 8 are attached directly to the inner edge of a plate 79 formed identically to plate 70 with the plate 79 secured to the upper channel flange 80 by another screw 78 to secure the underbody to the frame. The open channel is enclosed by the usual exterior trim panel 81 attached at its upper and lower edges to plate 79 and channel flange 76, respectively.

As in previous embodiments, the enclosed side rails 21c are adapted to house a side positioned exhaust conduit 82 which is preferably formed of stainless steel.

The vehicle construction of the invention departs only slightly from conventional separate body and frame vehicle design, thus enabling its adaptation to presently used designs with minimum expense. In many respects, the vehicle of the invention represents a simplification over conventional vehicles inasmuch as the body side sills as such are eliminated as well as frame brackets or outriggers for connecting the frame and body.

The proposed vehicle construction lends itself to present assembly techniques consisting principally of forming the several frame sections together and in a separate and distinct operation assembling the various body components. The body is then dropped into position on the frame and bolted or otherwise secured to the frame by working from the underside of the vehicle through the frame access openings or by direct access through the side rail where the latter is enclosed by the outboard trim panel.

Various modes of carrying out the invention are contemplated as being within the scope of the following claim particularly pointing out and distinctly claiming the subject matter which is regarded as the invention.

What is claimed is:

A vehicle construction, comprising a frame member having fore and aft pairs of laterally spaced tubular side rails and a pair of tubular center side rails disposed in laterally outwardly offset relation with the corresponding fore and aft side rails and connected thereto to provide a composite frame construction, a sheet metal body separate and distinct from said frame for mounting thereon and having opposed side walls spaced in accordance with the center side rails and a floor pan extending between said side walls and formed intermediately with downwardly depressed portions, resilient cushion means for mounting said body on said frame at predetermined mounting locations with said body side walls spaced directly above said center side rails and with said floor pan extended between and below the said center side rails, and a trim panel having its upper edge secured to said body above each corresponding center side rail and having its lower edge secured approximately beneath the corresponding center side rail, with a bend in said trim panel providing for limited flexing thereof in response to the functioning of said resilient cushion mounting means.

References Cited by the Examiner

UNITED STATES PATENTS

| | | | |
|---|---|---|---|
| 2,662,793 | 12/53 | Lindsay | 296—28 |
| 2,875,841 | 3/59 | Henderson | 296—28 X |
| 2,883,232 | 4/59 | Olley et al. | 296—28 |
| 2,954,998 | 10/60 | Kushler et al. | 296—28 |
| 2,964,331 | 12/60 | Sherman | 296—28 X |
| 2,965,414 | 12/60 | Engelhard | 296—35 |

A. HARRY LEVY, *Primary Examiner.*

PHILIP ARNOLD, *Examiner.*